United States Patent [19]
Fukuda

[11] Patent Number: 5,551,206
[45] Date of Patent: Sep. 3, 1996

[54] DETECTION OF OBJECTS WHERE PACKAGE-MAKING FILM SHEETS ARE SEALED

[75] Inventor: Masao Fukuda, Shiga, Japan

[73] Assignee: Ishida Co., Ltd., Japan

[21] Appl. No.: 345,180

[22] Filed: Nov. 28, 1994

[30] Foreign Application Priority Data

Dec. 28, 1993 [JP] Japan .................................. 5-351684

[51] Int. Cl.⁶ .............................. B65B 9/06; B65B 51/30; B65B 57/02
[52] U.S. Cl. .................................. 53/75; 53/451; 53/551
[58] Field of Search .................................. 53/75, 76, 451, 53/450, 551, 552, 555, 554

[56] References Cited

U.S. PATENT DOCUMENTS

| | | | |
|---|---|---|---|
| 4,546,596 | 10/1985 | Cherney | 53/75 X |
| 4,768,327 | 9/1988 | Mosher | 53/75 X |
| 5,117,612 | 6/1992 | Keim et al. | 53/451 |
| 5,147,491 | 9/1992 | Thomas et al. | 53/75 X |
| 5,289,671 | 3/1994 | Lerner et al. | 53/75 X |

FOREIGN PATENT DOCUMENTS 3907208  3/1989  Germany .

*Primary Examiner*—James F. Coan
*Attorney, Agent, or Firm*—Majestic, Parsons, Siebert & Hsue

[57] ABSTRACT

A form-fill-seal type packaging machine with a transverse sealer having a pair of seal jaws is initially operated for a number of cycles without introducing any articles to be packaged into bags which are being formed from an elongated thermoplastic film, and values of a selected physical variable indicative of the separation between the seal jaws are detected. From an average of these detected values and known variations in the thickness of the film, a standard range is determined for the selected physical variable. When the packaging is operated thereafter with articles introduced into the bags, the same physical variable is measured as each bag is transversely sealed and, if the measured value is outside the standard range, a warning is outputted or the film is not cut across the sealed position into two separated packages. The physical variable to be selected may be the torque on the motor which serves to move the seal jaws towards each other.

20 Claims, 4 Drawing Sheets

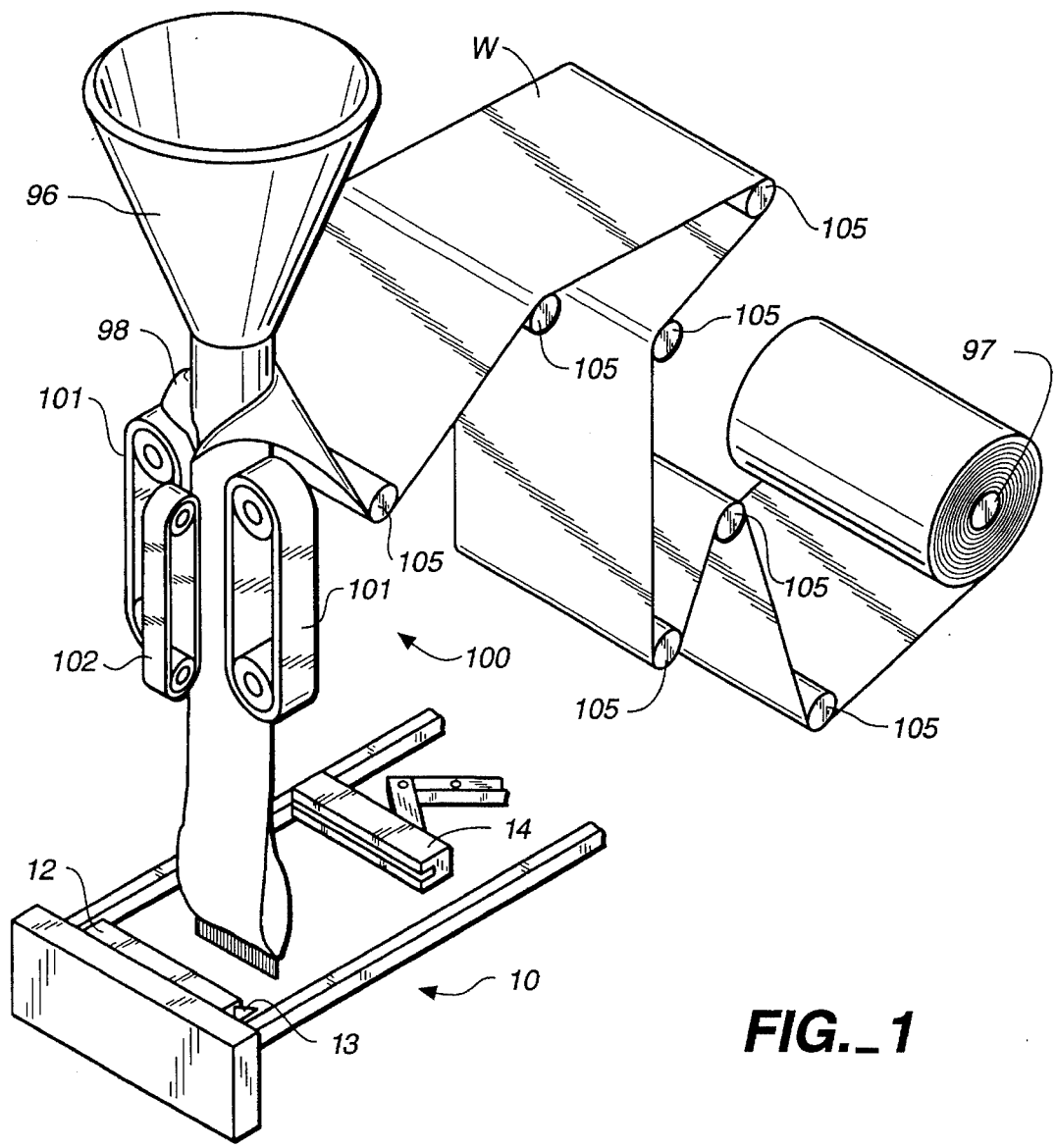
FIG._1

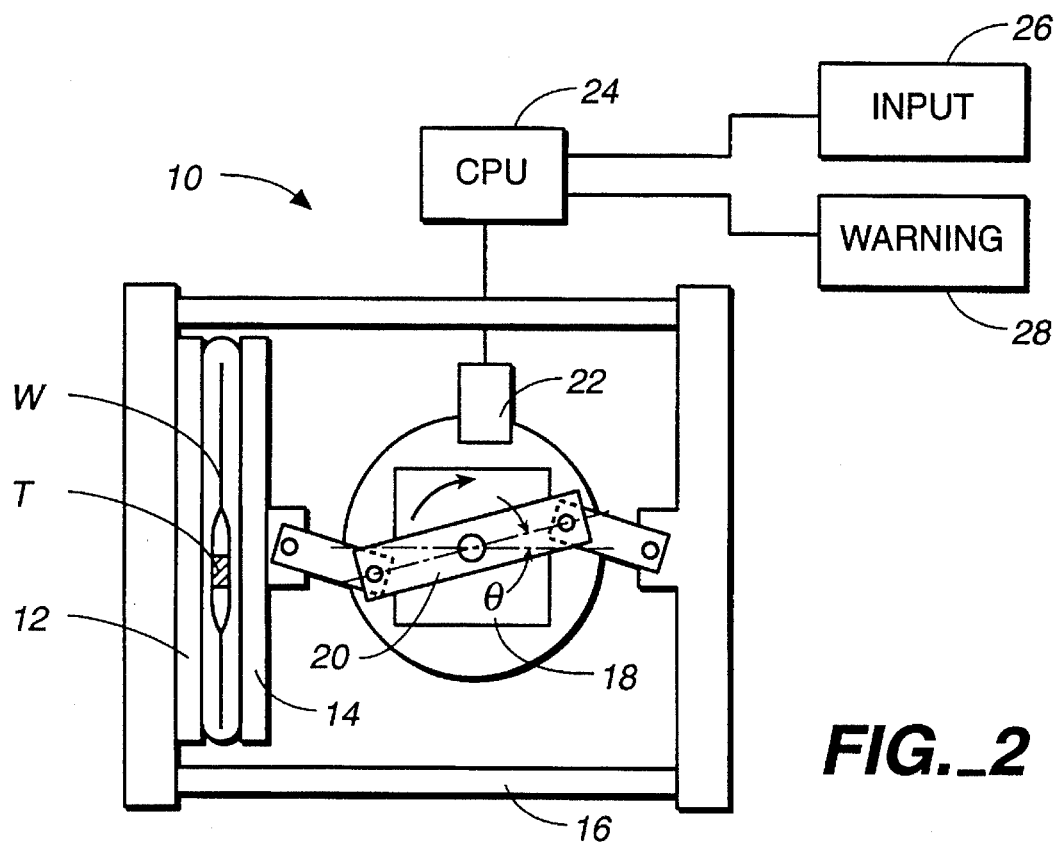
FIG._2
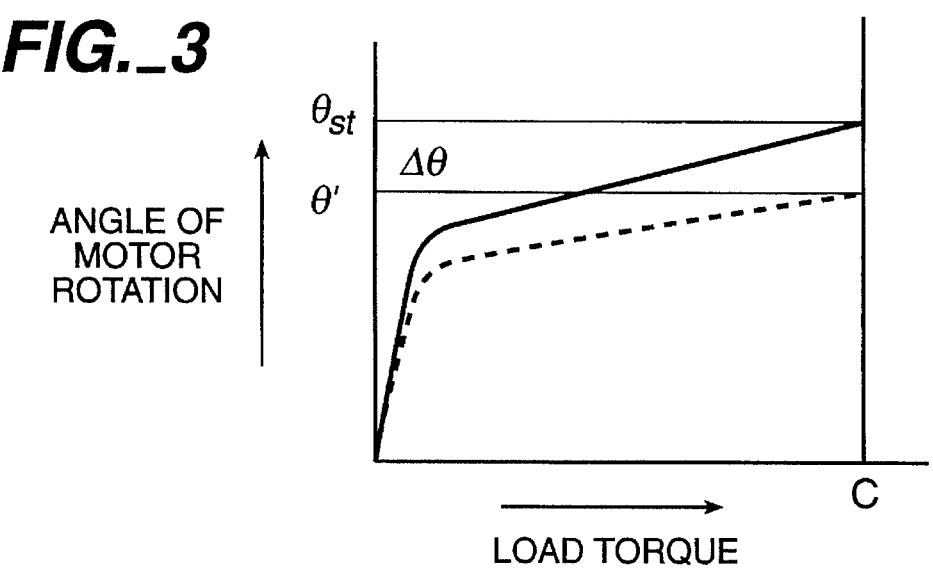
FIG._3

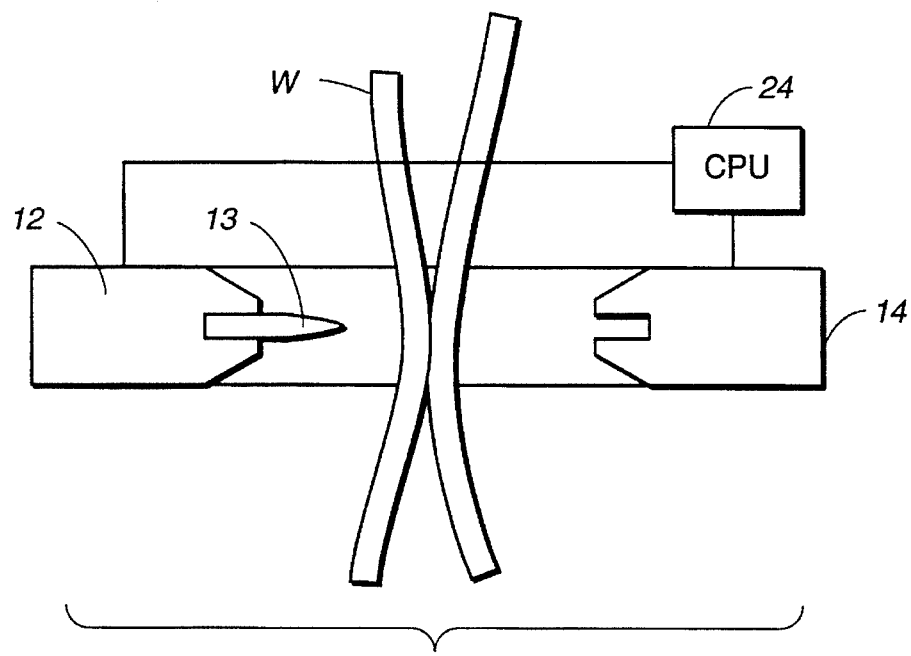
FIG._4
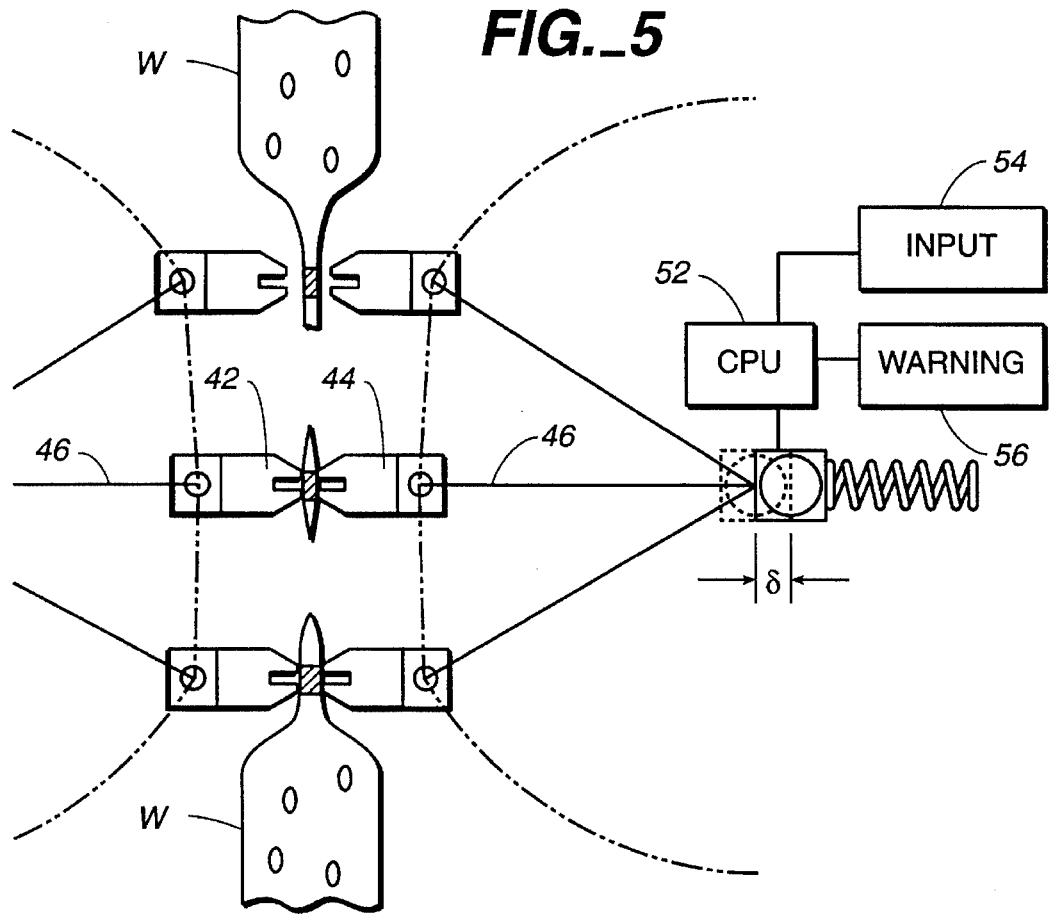
FIG._5

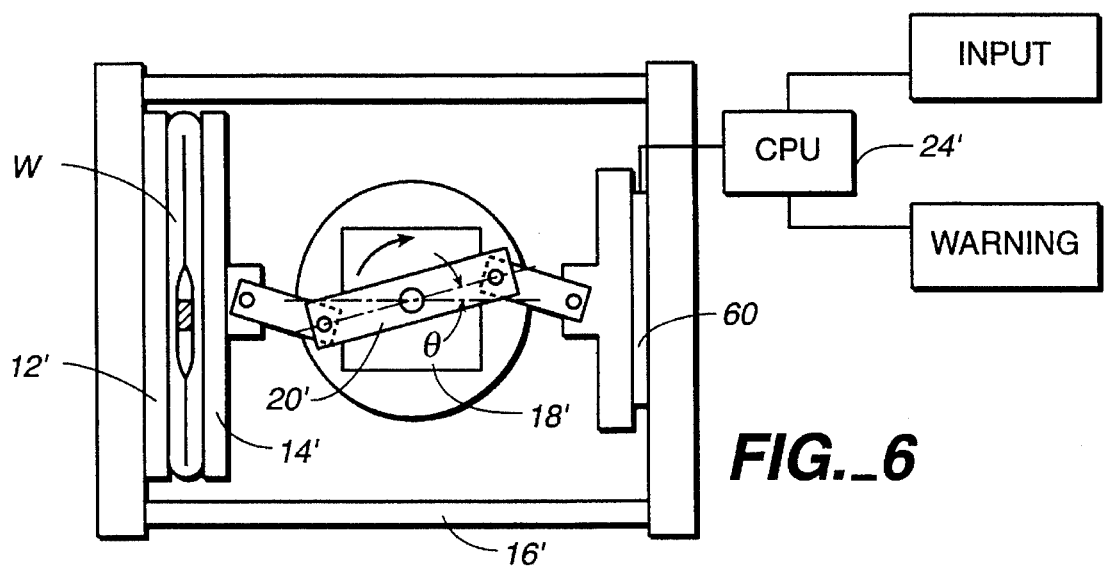
FIG._6
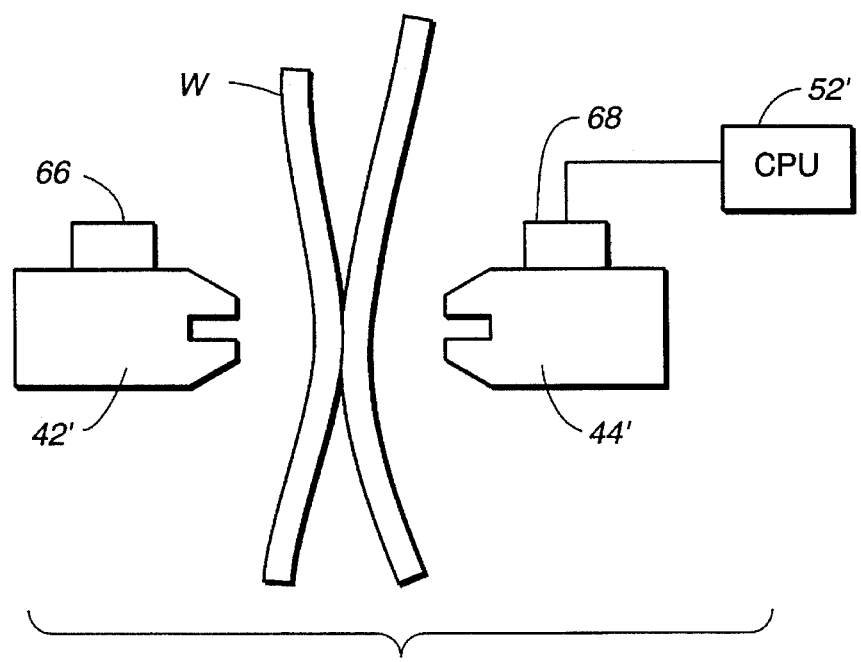
FIG._7

DETECTION OF OBJECTS WHERE PACKAGE-MAKING FILM SHEETS ARE SEALED

BACKGROUND OF THE INVENTION

This invention relates to packaging machines of the form-fill-seal type adapted to form a flexible thermoplastic film into a cylindrical tubular shape and thermally seal it after objects to be packaged are deposited inside. This invention relates more particularly to methods of and means for detecting objects where portions of the film are sealed together to close a bag formed by such a packaging machine.

Packaging machines, for example, of a vertical pillow type as disclosed in U.S. Pat. Nos. 5,279,098 issued Jan. 18, 1994 and 5,347,795 issued Sep. 20, 1994 (which are herein incorporated by reference) are adapted to form an elongated film into a cylindrical shape and seal it transversely as objects to be packaged are dropped inside. In order to prevent any of these objects from remaining where portions of the cylindrically formed film are sealed together, such packaging machines are usually adapted to provide vibrations to the film so as to shake and thereby remove crumb and small pieces of the objects from the inner surfaces of the cylindrically formed film where the sealing takes place. Measures have also been taken to force the film into taking a form with a rounded bottom in order to prevent the film from becoming wrinkled such that the film strength and air-tightness at sealed positions will not adversely affected.

In spite of all such measures taken, however, objects being packaged are sometimes caught where the transverse sealing takes place, and the film becomes wrinkled not infrequently. For this reason, it has been known to use a photoelectric device to detect the gap between sealing heaters or to detect variations in the pressure in the film in order to determine whether an abnormal condition has developed in the sealed position.

In general, however, it is not always at the same position that objects being packaged are caught or the film becomes wrinkled. Moreover, there are local variations in the thickness of the film. Thus, prior art detecting means of the kind described above cannot always accurately detect the existence of crumbs or small pieces at the seal positions. If the film thickness changes from one lot to the next, in particular, prior art detecting means are required to be reset every time a roll of film from a new lot is installed.

It is therefore an object of the present invention to provide improved methods of and means for accurately detecting the existence of objects inserted where a tubularly formed film is transversely sealed together as a packaging machine of a form-fill-seal type is operated to make packages.

It is another object of the invention to provide packaging machines adapted to use such an improved detection method.

SUMMARY OF THE INVENTION

A method according to the present invention, with which the above the other objects can be accomplished, may be characterized as comprising the steps of initially running the packaging machine to make empty bags without supplying any articles into them as they are formed to thereby determine a standard range in a selected physical variable in terms of which the occurrence of an abnormal situation is intended to be detected, and then measuring that physical variable every time a package is formed by sealing a bag after it is filled with articles. The measured value of the selected physical variable is compared with the predetermined standard range to detect an abnormal situation. If the packaging machine is of a kind using a servo motor to cause a pair of seal jaws to compress the film from both sides for transverse sealing, the torque on the motor may be selected as the physical variable. If a load cell is provided for measuring the compressive force between the seal jaws, this compressive force may be treated as the selected physical variable.

A packaging machine embodying the invention may be characterized as comprising, in addition to common components of prior art form-fill-seal packaging machines such as a transverse sealer with a pair of seal jaws, but also measuring means for measuring values of a selected physical variable which vary with the separation between the seal jaws and a control unit for receiving signals indicative of measured values of the selected physical variable. The control unit may comprise a central processing unit programmed to determine not only an average of measured values but also a standard range therearound such that a method according to the invention can be carried out.

Many variations are possible on the principles described above. A standard range is a selected physical variable may be determined by making only one bag or by causing the seal jaws to come into contact with each other without passing the film therebetween and determining a range from the thickness of the film. The physical variable to be selected may be the distance by which the seal jaws are moved towards each other, and a photosensor of a known kind may be used to directly measure the separation between the seal jaws.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic diagonal view of a portion of a packaging machine of a form-fill-seal type incorporating the present invention;

FIG. 2 is a schematic plan view of a portion of the transverse sealer in the packaging machine of FIG. 1 for showing the principle of a method according to the invention;

FIG. 3 is a graph which shows the effect of a large inserted object at the seal position on the relationship between the angle of rotation by the servo motor of FIG. 2 and its load torque;

FIG. 4 is a side sectional view of a pair of seal jaws with a retractable blade and a control unit therefor, embodying the present invention;

FIG. 5 is a schematic side view of a portion of another packaging machine with a different transverse sealer according to the present invention;

FIG. 6 is a schematic plan view of a portion of another transverse sealer which may be incorporated-in the packaging machine of FIG. 1 and shows the principle of another method according to the invention; and FIG. 7 is a schematic of a portion of still another transverse sealer.

DETAILED DESCRIPTION OF THE INVENTION

The invention will be described below by way of examples as applied to form-fill-seal type packaging machines of different kinds. For the purpose of reference, there is schematically shown in FIG. 1 a relevant portion of such a packaging machine of a vertical pillow type which may incorporate the present invention, having a web of flexible thermoplastic film W unwinding from a film supply roll 97. The film W is guided by a plurality of guide rolls 105 to a former 98 of a known kind. After it is thereby formed into a tubular shape, it is pulled down by a film-pulling unit 100 including a parallel-running pair of pull-down belts 101 and a longitudinal sealer in the form of a heater belt 102 for sealing together the mutually overlapping edge portions of the film W. Next, the film W, which is now in a cylindrical shape, is sealed horizontally (that is, transversely to its downward direction of motion) by a transverse sealer 10 disposed below the film-pulling unit 100, as articles to be packaged are dropped from a hopper 96 above the former 98.

As shown more clearly in FIG. 2, the transverse sealer 10 according to this embodiment of the invention includes a fixed seal jaw 12 and a mobile seal jaw 14 both of a known structure and symmetrically disposed with respect to the tubular film W which is sandwiched therebetween. The fixed seal jaw 12 is affixed to a frame structure 16 and hence remains stationary. The mobile seal jaw 14 is in a motion-communicating relationship with a servo motor 18 through a linkage mechanism 20 such that the rotary motion of the motor 18 is translated into a linear motion whereby the pair of seal jaws 12 and 14 move towards or away from each other. The servo motor 18 is of a so-called turnbuckle kind adapted to change the direction of its rotary motion when the load torque thereon due to the compression between the seal jaws 12 and 14 exceeds a specified value.

Numeral 22 in FIG. 2 indicates a rotary encoder adapted to detect the angle by which the servo motor 18 rotates until the direction of its rotary motion is reversed. A signal indicative of the angle thus detected by the encoder 22 is transmitted to a control unit 24 comprising a central processing unit (CPU).

According to a detection method embodying the present invention by using a transverse sealer as described above and shown at 10 in FIGS. 1 and 2, the packaging machine is operated for a specified number of cycles to form a plurality of bags without introducing any articles thereinto from the hopper 96 through the former 98. As each bag is closed by the transverse sealer 10, the servo motor 18 rotates by an angle $\theta$ until the direction of its rotation is reversed by the load torque developed by the contact between the seal jaws 12 and 14 to seal the overlapped film sheets together as shown in FIG. 2. This angle $\theta$ of rotation by the servo motor 18 is detected by the rotary encoder 22, and a signal indicative of this angle $\theta$ is outputted to the control unit 24. If a plural number n of empty bags are thus produced in such a preliminary dry run, n signals indicative of n values of angles $\theta_1$–$\theta_n$ are received by the control unit 24. The control unit 24 is adapted to determine a standard value $\theta_{ST}$ by calculating an average angle of rotation $\theta_m$ either as the simple algebraic mean of these n angles $\theta_1$–$\theta_n$, or by initially removing abnormally large or small ones of them and then calculating the algebraic mean of the rest. Appropriate values $\alpha$ and $\beta$, depending, for example, on expected variations in the thickness of the film W, are inputted by the user through an input device 26, such that the control unit 24 will interpret only angles between the maximum value $\theta_m+\alpha$ and the minimum value $\theta_m-\beta$ to be within the standard range. A regular package-making operation of the packaging machine is carried out thereafter by introducing articles from the hopper 96 as bags are formed and sealed. In each cycle of the operation, as a bag is sealed by the transverse sealer 10, the rotary encoder 22 detects the angle $\theta'$ by which the servo motor 18 has rotated until the direction of its rotation was reversed. When a signal indicative of the magnitude of this detected angle $\theta'$ and transmitted from the encoder 22 is received, the control unit 24 determines whether the detected angle $\theta'$ is within the aforementioned standard range between the maximum angle $\theta_m+\alpha$ and the minimum angle $\theta_m-\beta$.

Generally, the detected angle $\theta'$ of rotation by the servo motor 18 changes from one bag to the next, depending on the longitudinal variation in the thickness of the film W, as well as the existence or absence at the seal position of crumbs or small pieces of the articles being packaged. The effects of the variation in the thickness of the film W, however, are smaller and within the allowable range of the standard value $\theta_{ST}$. If the portion (schematically indicated by T in FIG. 2) of the objects or a wrinkle in the film W, caught between the film portions at the seal position, is large enough not to be negligible with respect to the width of the allowable range, on the other hand, the characteristic curve relating the angle of rotation $\theta$ and the load torque C of the servo motor 18 changes as shown in FIG. 3 such that the existence of an abnormal condition can be detected from the difference $\Delta\theta$ between the standard angle $\theta_{ST}$ and the actually detected angle $\theta$ when the direction of rotation of the servo motor 18 is reversed.

If it is determined by the control unit 24 that the detected angle $\theta$ is not within the allowable range of the standard value $\theta_{ST}$ as defined above, a warning device 28 is activated to inform the user of the occurrence of an abnormal situation. The warning device 28 may be an acoustic device such as a buzzer or any other means of outputting information. Alternatively, or additionally, the control unit 24 may be programmed to stop the operation of the packaging machine when such an abnormal situation is detected. Such an embodiment, however, is not preferred because the efficiency of operation is adversely affected. According to a preferred embodiment of the invention, the overall operation of the packaging machine is not interrupted even if the existence of an intolerably large object is detected by the control unit 24 according to the routine described above, but the film W is not cut across the seal position identified as the source of an abnormal situation. Normally, as shown in FIG. 4 more clearly, one of the seal jaws 12 and 14 is provided with a blade 13 and the other formed with a matching groove. When the film M is transversely sealed across its seal position, it serves both as the top of one package which has just been filled and closed and as the bottom of the next bag which is about to be filled. The blade 13 normally serves to cut the film between these two bags. According to this embodiment of the invention, the blade 13 is controllably retractable and the control unit 24, when it detects an abnormal situation as described above, causes the blade 13 to be retracted such that the film W will not be cut thereby and separated into two packages, and the two packages are discharged together while remaining mutually connected to each other. Since it is generally difficult to ascertain whether the abnormal condition was detected because crumbs or small pieces were inserted above or below the line across which the film would be cut by the blade, it is a practical procedure to discard both of the connected packages.

The invention is not limited to the embodiment described above, but many modifications and variations can be made within the scope of the invention. In the case of a packaging machine of the type described, for example, in aforementioned U.S. Pat. No. 5,347,795 of which the transverse sealer is sketched in FIG. 5, seal jaws 42 and 44, forming a pair, are each supported at one end of an arm-like elongated member 46. Each arm 46 is adapted to rotate around an horizontal axis 48 through the other end thereof, and the axes 48 thus supporting the arms 46 are controllably moved horizontally towards or away from each other such that each of the seal jaws 42 and 44 will move in a D-shaped trajectory with a vertically straight part and a circularly arcuate part. With a packaging machine of this type, the horizontal distance by which each axis 48 is moved may be used to detect an abnormal situation. In FIG. 5, numeral 50 indicates a device for detecting the horizontal distance δ by which either of the seal jaws 42 and 44 is moved and numeral 52 indicates a control unit such as a central processing unit (CPU), of which the function is similar to that of the control unit 24 shown in FIG. 2. According to a preferred detection method according to the invention, the packaging machine is operated again for a specified number of cycles to form a plurality of bags without introducing any articles thereinto and, as each empty bag is sealed between the seal jaws 42 and 44, the distance δ detected by the detecting means 50 is measured and determined. If a plural number n of empty bags are thus produced in such a preliminary dry run, n distances $\delta_1$–$\delta_n$ are determined. From these values, the control unit 52 proceeds as explained above for the CPU 24 with referenced to FIG. 2, determining a standard value $\delta_{ST}$ by calculating an average distance as the simple algebraic mean of these n distances $\delta_1$–$\delta_n$, or by initially removing abnormally large or small ones of them and then calculating the algebraic mean of the rest. Again, appropriate values α and β, depending, for example, on the variations in the thickness of the film W, are inputted by the user through an input device 54, and the control unit 52 defines a range around the standard value $\delta_{ST}$ outside which the situation may be considered abnormal. Numeral 56 indicates a warning device, of which the function is identical to the warning device 28 shown in FIG. 2. After the "standard range" is determined as explained above, the packaging machine is operated with articles introduced into the bags as they are formed by the packaging machine. At each transverse sealing, it is examined whether the distance δ' detected by the detecting means 50 is within this standard range and, if it is not, the warning device 56 is activated. It now goes without saying that the control unit 54 may again be so programmed to prevent the film W from being cut when an abnormal situation is detected.

The two methods of detection, described above, may be both described in common as comprising firstly the step of selecting a physical variable indicative of the separation between the pair of seal jaws, and secondly-the step of setting a standard range in this selected physical variable by running the-packaging machine to produce empty bags. Only after such a standard range is determined, the packaging machine is operated to produce real packages with articles introduced thereinto as they are being formed. The separation between the seal jaws is determined, as each package is formed, in terms of the selected physical variable and an abnormal situation is identified by comparing the measured value of the physical variable with the standard range defining the normal situation. In the first embodiment of the invention described above with reference to FIGS. 1 and 2, the selected physical variable was the torque on the motor 18, and a standard range was defined as a range in the value of torque. In the second embodiment of the invention described above with reference to FIG. 5, the selected physical variable was the distance 8 detected by the detecting means 50.

According to a third embodiment of the invention illustrated in FIG. 6 wherein components, which are substantially identical to those described above, are indicated by the same numeral for convenience, a force-detecting means 60 such as a load cell is provided between the frame structure 16' and the linkage mechanism 20' such that a signal indicative of the compressive force between the seal jaws. 12' and 14' is transmitted therefrom to a control unit 24'. A packaging machine incorporating such a transverse sealer is also preliminarily operated, according to the present invention, to make a plurality of empty bags, and a standard force value is determined by the control unit 24' from the force values detected by the force-detecting means 60 when these empty bags are produced. In this embodiment of the invention, the selected physical value is the compressive force between the seal jaws 12' and 14', and the determination of abnormal situations can be carried out similarly as described above with reference to the first embodiment of the invention.

FIG. 7 illustrates a still another embodiment of the invention, characterized as comprising a photoelectric detector comprising a light-emitting element 66 and a light-receiving element 68 attached respectively to the pair of seal jaws 42' and 44' such that a signal indicative of the separation between the seal jaws 42' and 44' is transmitted to a control unit 52'. The operations by the control unit 52' to determine a standard range and to detect an abnormal situation as packages enclosing articles are produced are similar to those described above with reference to control units according to the first and second embodiments of the invention and hence will not be repeated.

As further variations of the methods described above, a standard range may be initially determined without producing any empty bags. According to these variations, the seal jaws (with reference to any of the packaging machines described above) are brought next to each other without the film W passed therebetween and the selected physical variable (for example, the torque on the motor 18 in the case of the sealer shown in FIG. 2, the distance δ of motion in the embodiment shown in FIG. 5, and the force detected by the load cell 60 in the case of the embodiment shown in FIG. 6) is measured under this condition. A standard range is thereafter selected according to the known property of the film W (that is, its thickness and expected variations in its thickness among different lots) and may be inputted to the control unit through an input means (such as shown at 26 and 54 in FIGS. 2 and 5, respectively).

When an abnormal situation is detected, a warning signal may be outputted in any known form, the entire operation of the packaging machine may be temporarily stopped or the operation may be continued but without cutting the film at the seal position where the abnormal situation has occurred. Any of these methods may be incorporated in any of the packaging machines described above. In summary, the invention is intended to be interpreted broadly and all combinations of inventive concepts disclosed above are intended to be within the scope of the invention.

What is claimed is:

1. A method of operating a packaging machine of a form-fill-seal type having a pair of sealing means operated by a motor for compressing film sheets together therebetween at a seal position to seal said film sheets together and to thereby form a bag, and detecting the existence of objects inserted between said film sheets at said seal position, said method comprising the steps of:

selecting a physical variable which relates to motion of said sealing means, varies with the separation between said pair of sealing means and is selected from the group consisting of the compression force between said sealing means, the distance between said pair of sealing means and the torque of said motor for moving said sealing means;

setting a standard range in said physical variable, said standard range including a standard value of said physical variable which is experimentally determined as corresponding to the separation between said pair of sealing means when said film sheets are sealed together by moving said pair of sealing means towards each other without any objects inserted between said film sheets;

operating said packaging machine to form a filled package by forming a bag with said film sheets, introducing objects into said bag, and moving said pair of sealing means towards each other to seal said bag;

obtaining a measured value of said physical variable when said bag is sealed; and determining whether said measured value is within said standard range.

2. The method of claim 1 wherein said standard value is set by operating said packaging machine to form an empty bag with said film sheets without introducing any objects thereinto and measuring a value of said physical variable when said empty bag is sealed.

3. The method of claim 1 wherein said standard value is determined by causing said pair of sealing means to come into contact with each other without inserting said film therebetween and using natural thickness of said film sheets.

4. The method of claim 1 wherein said standard value is set by operating said packaging machine to form a plurality of empty bags with said film sheets without introducing any objects thereinto, measuring values of said physical variable when said empty bags are sealed, and calculating an average of said measured values.

5. The method of claim 1 wherein said physical variable is the compressive force with which said film sheets are compressed together to be sealed at said seal position by said sealing means.

6. The method of claim 1 wherein said physical variable is the distance between said pair of sealing means.

7. The method of claim 1 wherein said pair of sealing means is moved away from or towards each other by converting rotary motion of said motor into a linear motion, said physical variable being the torque of said motor.

8. The method of claim 1 further comprising the step of selecting parameters which define said standard range from said standard value.

9. The method of claim 1 wherein said step of forming a filled packages is repeated sequentially, said method further comprising the step of cutting said film to separate one from the next one of said filled packages only if said measured value is within said standard range but keeping said one filled package connected to said next one if said measured value is not within said standard range.

10. The method of claim 1 wherein said physical variable is continuously varying.

11. A packaging machine of a form-fill-seal type comprising:

a film supporting means for supporting a roll of film of a bag-making material;

a former for forming said film into a tubular shape;

film guiding means for guiding said film from said film supporting means to said former and said tubularly formed film in a longitudinal direction;

a longitudinal sealer for sealing side edges of said tubularly formed film together in said longitudinal direction;

a transverse sealer having a pair of sealing means operated by a motor for compressing and sealing sheets of said tubularly formed film together therebetween transversely to said longitudinal direction and thereby forming a bag;

a measuring means for measuring a physical variable which relates to motion of said sealing means, varies with the separation between said pair of sealing means and is selected from the group consisting of the compression force between said sealing means, the distance between said pair of sealing means and the torque of said motor for moving said sealing means; and a control means for determining a standard value of said physical variable from one or more measured values of said selected variable obtained by said measuring means, said standard value corresponding to said separation when said film sheets are sealed together by said sealing means without any objects inserted therebetween, and for determining whether a measured value obtained by said measuring means is within a pre-determined range which contains said standard value.

12. The packaging machine of claim 11 wherein said control means serves to calculate an average of a plurality of said measured values obtained by forming bags by said packaging machine without introducing any objects thereinto, said standard value being set equal to said average.

13. The packaging machine of claim 11 wherein said transverse sealer includes motion-communicating means for converting rotary motion of said motor into a linear relative motion of said sealing means and thereby moving said pair of sealing means towards or away from each other, said physical variable being torque of said motor and said measuring means including a rotary encoder.

14. The packaging machine of claim 11 wherein said transverse sealer includes a load cell means for measuring compressive force between said pair of sealing means, and said physical variable is the compressive force between said pair of sealing means.

15. The packaging machine of claim 11 wherein said physical variable is the distance between said pair of sealing means.

16. The packaging machine of claim 11 wherein said transverse sealer further includes a pair of elongated arms each being rotatable around one of a mutually parallel pair of axes through one end thereof and having one of said sealing means at the other end thereof, the other ends of said arms being movable towards or away from each other such that said sealing means travel on a D-shaped trajectories around said axes, said physical variable being the distance by which one of said axes is moved towards or away from the other of said axes.

17. The packaging machine of claim 15 wherein said transverse sealer includes photoelectric detecting means attached to said pair of sealing means for measuring the distance therebetween.

18. The packaging machine of claim 11 where said transverse sealer further includes cutting means for cutting said film transversely, said control means serving to allow said cutting means to cut said film only if said measured value is within said pre-determined range and to retract said cutting means to thereby prevent said film to be cut by said cutting means if said measured value is outside said range.

19. The packaging machine of claim 11 further comprising an input means for allowing a user to input a calculated value as said standard value into said control means, said calculated value being obtained from the natural thickness of said film.

20. The packaging machine of claim 11 wherein said physical variable is continuously varying.

* * * * *